Patented Dec. 29, 1936

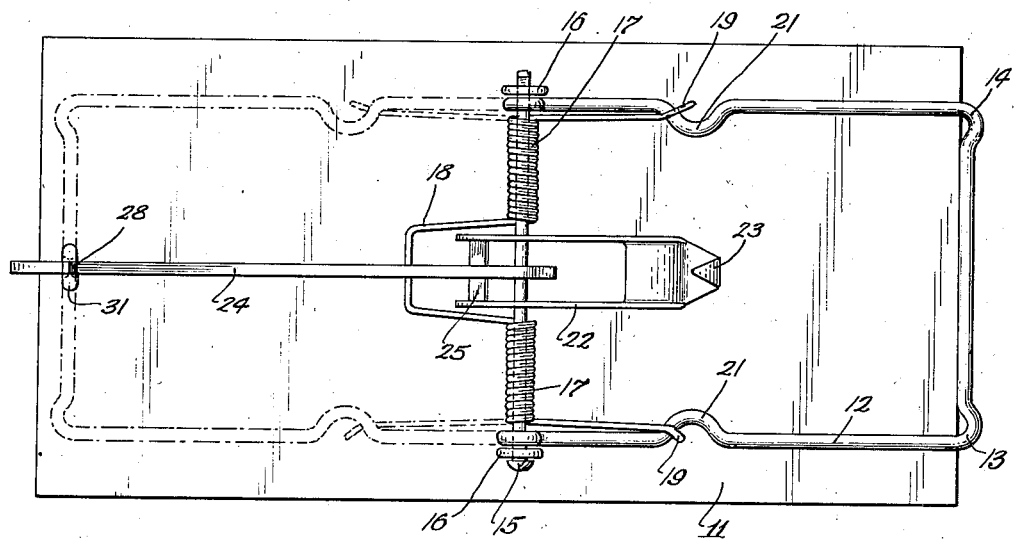
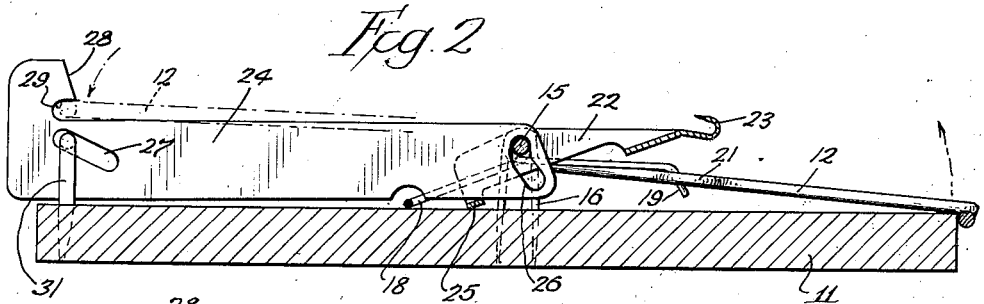
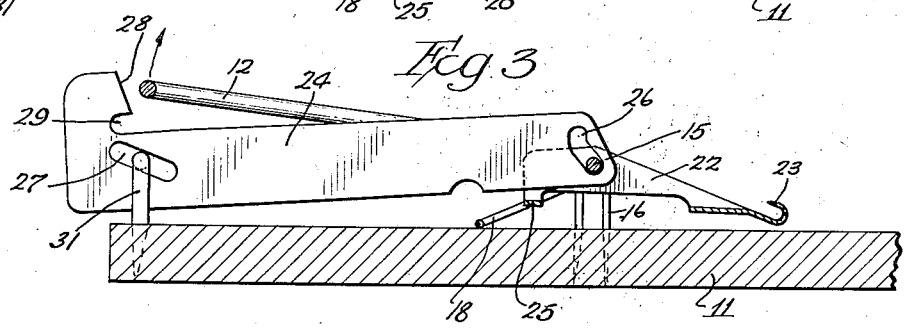

2,065,701

UNITED STATES PATENT OFFICE 2,065,701

ANIMAL TRAP

Henry J. Houtsinger, Chicago, Ill., assignor to Laura E. Carpenter, Winnetka, Ill., and Herbert A. Stilson, Chicago, Ill.

Application February 20, 1933, Serial No. 657,571

4 Claims. (Cl. 43—83)

This invention relates to animal traps of the spring jaw type, i. e., the type of trap wherein a U-shaped bail, strongly backed by a spring, is provided to swing over upon a base, when permitted by the bait-holding treadle, to press upon the neck or body of the animal to hold it in an entrapped position.

The principal object of the invention is the provision of a simple, cheaply constructed jaw holding latch and a bait treadle, so constructed and arranged that the trap may be set by merely rotating the jaw into set relation with the latch. Differently stated, it may be said that the invention has for its principal object the provision of a self-setting trap of simple construction, having certainty of action and being sensitive in operation.

Numerous other objects and advantages of the invention will be apparent as it is better understood from the following description, which, taken in connection with the accompanying drawing, discloses a preferred embodiment thereof.

Referring now to the drawing,

Fig. 1 is a top view of the trap embodying the present invention;

Fig. 2 is a longitudinal vertical sectional view through the trap showing the parts in sprung position; and Fig. 3 is a similar view illustrating the springing of the trap.

The trap shown on the drawing which constitutes the embodiment of the invention at present preferred, comprises a rectangular base 11 which may be of wood or other desired material. A jaw 12 of heavy wire bent at 13 and at 14 to U-form is pivoted upon a cross shaft or nail 15 which is arranged through end staples 16. The jaw 12 is pressed to sprung position by two coil spring units 17, preferably coiled from a single piece of wire looped at its center at 18, for engagement with the base, and having its ends 19 hooked over or into bends 21 in the legs of the jaw 12. The parts of the trap thus far described may be of usual or preferred construction and shape.

A bait-holding treadle, generally indicated by reference character 22, is pivoted upon the shaft or nail 15, and is constructed of a piece of sheet metal having its sides bent up into parallelism to give a general channel shape. At the front the bait-holding treadle is formed into a tang or hook 23 to engage and hold suitable bait. The central part of the treadle is cut away to provide clearance for the forward end of a latch member 24, as will be presently described, and to provide a cross-bridge member 25 arranged beneath the forward end of the latch member, and adapted upon movement of the treadle to release the trap.

The latch member 24 is or may be of sheet metal stock, and is in the form of a bar or elongated narrow plate provided with a sharply inclined slot 26 at the front end and an inclined slot 27 near the rear end. The slot 27 is or may be of less inclination than the slot 26. The rear end of the latch member extends up and forwardly to provide a cam surface 28 for engagement with the jaw and a recess 29 into which the jaw is arrangeable to hold the trap in set condition. The shaft or nail 15 is arranged through the slot 26 and a staple 31 is disposed through the slot 27 and into the base 11 at the rear. The dimension of the parts is such that the forward end of the latch rests upon the cross-bridge part 25 of the treadle except when the jaw is moving from set to sprung position and from sprung to set position.

The trap is adapted to be set by merely swinging the jaw from the full line position in Fig. 2 in a counter clockwise direction to the position shown in dotted lines. As the jaw approaches set position, it engages the cam surface 28 and moves the latch rearwardly. This movement causes the latch to move upwardly, the slots 26 and 27 riding over the shaft 15 and staple 31 respectively. As soon as the jaw is arranged beneath the cam 28, gravity causes the latch to move forwardly and downwardly, and the bait treadle to be arranged with its bait-holding tang 23 in elevated position. Any movement of the bait treadle from this position causes a rearward and upward movement of the latch and release of the jaw. The more sharp inclination of the slot 26 causes a slight swinging movement of the latch and a quick release of the jaw.

It is thought that this invention and many of its attendant advantages will be understood from the foregoing description, and it will be apparent that many changes may be made in the form, construction and arrangement of the parts without departing from the spirit and scope of the invention or sacrificing all of its material advantages, the form hereinbefore described being merely a preferred embodiment thereof.

I claim:

1. An animal trap, comprising a base, a spring actuated jaw, a horizontally disposed bait-holding treadle pivoted on the base and having a latch engaging part horizontally arranged on the opposite side of the pivotal axis of the member from the bait-holding portion of the treadle, and a horizontally disposed latch member having a cam surface engageable by said jaw to move said latch member rearwardly as the jaw is moved toward set position and having also a jaw receiving recess, said latch member being movable toward the front of the trap to engage said jaw in said recess.

2. An animal trap, comprising a base, a spring actuated jaw, a bait-holding treadle, a latch member having inclined slots at its front and rear ends, and supporting means arranged through said slots to guide said latch member in its movement, said slots and supporting means being disposed to provide said movement as first, upwardly and rearwardly to permit said jaw to arrive at set position, and then forwardly and downwardly to engage and hold said jaw, and means for operating the latch by the treadle to release the jaw.

3. An animal trap, comprising a base, a spring actuated jaw, a bait-holding treadle, and a latch member having inclined slots at its front and rear ends, means extending through the slots for supporting the latch, the supporting means and slots being disposed whereby said latch member has a reciprocation and a swinging movement, first, rearwardly and upwardly to permit said jaw to come to set position, and then forwardly and downwardly to engage and hold said jaw, and means for operating the latch by the treadle to release the jaw.

4. An animal trap comprising a base, a spring actuated jaw, a latch bar lying horizontal of the base and having inclined slots at opposite ends, supports in the slots, said slots being disposed to permit an upward and rearward movement of the latch and a downward and forward movement, a cam and catch on the latch for effecting such movements of the latch by the jaw and holding the jaw when moved to set position, one of said slots having a locking extension to lock the latch on the corresponding support with the jaw in set position, and a bait treadle for lifting the latch to release the slot extension from its support and release the jaw.

HENRY J. HOUTSINGER.